United States Patent
Hori et al.

(10) Patent No.: US 8,123,280 B2
(45) Date of Patent: Feb. 28, 2012

(54) ARMREST FOR VEHICLE

(75) Inventors: Munenori Hori, Miyoshi (JP); Mitsuru Serifu, Anjoh (JP); Yoshiyuki Ono, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 96 days.

(21) Appl. No.: 12/818,557

(22) Filed: Jun. 18, 2010

(65) Prior Publication Data

US 2010/0327646 A1    Dec. 30, 2010

(30) Foreign Application Priority Data

Jun. 30, 2009   (JP) ................................. 2009-155271

(51) Int. Cl.
*B60N 2/46* (2006.01)
*B60N 3/02* (2006.01)

(52) U.S. Cl. ................. 296/153; 296/187.05; 296/146.7; 296/1.09

(58) Field of Classification Search ................... 296/153, 296/146.7, 187.05, 187.12, 1.09; 280/751; 297/411.21, 411.45
See application file for complete search history.

(56) References Cited

U.S. PATENT DOCUMENTS

| | | | |
|---|---|---|---|
| 5,527,084 A * | 6/1996 | Scherf | 296/153 |
| 6,248,205 B1 * | 6/2001 | Scheidmantel et al. | 156/309.6 |
| 6,893,077 B1 * | 5/2005 | DeJongh | 296/187.05 |
| 7,104,590 B2 * | 9/2006 | Dooley et al. | 296/153 |
| 7,387,326 B2 * | 6/2008 | Osada | 296/39.1 |
| 7,775,584 B2 * | 8/2010 | Hughes et al. | 296/187.05 |
| 7,794,008 B2 * | 9/2010 | Hall et al. | 296/153 |
| 7,794,009 B2 * | 9/2010 | Pinkerton et al. | 296/153 |
| 7,794,010 B2 * | 9/2010 | Saida et al. | 296/153 |
| 7,828,388 B2 * | 11/2010 | Thomas | 297/411.21 |
| 2005/0194806 A1 * | 9/2005 | Cowelchuk et al. | 296/1.09 |
| 2006/0138802 A1 * | 6/2006 | Dreier et al. | 296/153 |
| 2006/0200960 A1 * | 9/2006 | Reed et al. | 29/91.1 |
| 2009/0256384 A1 * | 10/2009 | Hughes et al. | 296/153 |
| 2010/0327646 A1 * | 12/2010 | Hori et al. | 297/411.21 |

FOREIGN PATENT DOCUMENTS

| | | |
|---|---|---|
| JP | 9-66740 | 3/1997 |
| JP | 2007-276723 | 10/2007 |

* cited by examiner

*Primary Examiner* — Glenn Dayoan
*Assistant Examiner* — Gregory Blankenship
(74) *Attorney, Agent, or Firm* — Greenblum & Bernstein, P.L.C.

(57) ABSTRACT

An armrest for a vehicle is provided that does not increase the number of parts and the assembly process, absorbs the shock of lateral collision of the vehicle by deformation of an armrest core member, and has the armrest core member that is not easily deformed during normal use. The armrest for the vehicle includes an armrest core member and a cushion member attached on an upper surface of the armrest core member. A boss is provided to extend from the armrest core member, and the armrest core member is attached to a door trim of the vehicle by the boss. A rib is provided on a circumferential surface of the boss, and has an extending portion extending in a lateral direction of the vehicle. The extending portion is integrally formed with the upper surface or a lower surface of the armrest core member.

6 Claims, 9 Drawing Sheets

US 8,123,280 B2

ARMREST FOR VEHICLE

CROSS-REFERENCE TO RELATED APPLICATIONS

The present application claims priority under 35 U.S.C. §119 of Japanese Application No. 2009-155271, filed on Jun. 30, 2009, the disclosure of which is expressly incorporated by reference herein in its entirety.

BACKGROUND OF THE INVENTION

1. Field of the Invention

The present invention relates to an armrest for a vehicle.

2. Description of Related Art

Conventionally, an armrest for a vehicle is known in which multiple opening portions are provided in the upper surface of an armrest core member attached on an inboard side of a door trim of the vehicle (Japanese Patent Application Publication No. 2007-276723 (JP2007-276723)). This armrest is formed such that the armrest core member is easily deformed at the opening portions, functioning as an origin of fracture, at the time of lateral collision. According to this armrest, the deformation of the armrest core member can absorb the shock of the lateral collision, and a passenger can be protected from the shock of the lateral collision of the vehicle.

However, while the armrest of the vehicle described in JP2007-276723 can absorb the shock of the lateral collision by the deformation of the armrest core member, the rigidity of the armrest core member against the load from the above is also reduced. Accordingly, the armrest core member can be deformed easily during normal or general use, and thus, the product quality is degraded.

Therefore, conventionally, an armrest for a vehicle is known in which a separate reinforcing plate is provided on the back of the upper surface of the armrest core member (Japanese Patent Application Publication No. H09-66740 (JP H09-66740)). According to this armrest, since the armrest core member is easily deformed, the shock of the lateral collision of the vehicle can be absorbed. Further, the separate reinforcing plate can prevent the armrest core member from being easily deformed during normal use.

However, according to the armrest for the vehicle described in JP H09-66740, the separate reinforcing plate should be provided on the back of the upper surface of the armrest core member. Therefore, the number of parts (components) and an assembly process increase.

SUMMARY OF THE INVENTION

In view of the above described circumstances, the present invention provides an armrest for a vehicle in which, without increasing the number of parts and the assembly process, the shock of lateral collision of the vehicle is absorbed by the deformation of an armrest core member, and the armrest core member is not easily deformed during normal use.

An armrest for a vehicle according to an aspect of the present invention includes an armrest core member; a cushion member attached on an upper surface of the armrest core member; and a boss extending from the armrest core member. The armrest is attached to a door trim of the vehicle via the boss. The armrest further includes a rib provided on an outer circumferential surface of the boss. The rib has an extending portion extending in a lateral direction of the vehicle. The extending portion is integrally formed with the upper surface or a lower surface of the armrest core member.

According to the armrest of the aspect of the present invention, the extending portion, which is formed by extending the rib formed on the outer circumferential surface of the boss in the lateral direction of the vehicle, is integrally formed with the upper surface or the lower surface of the armrest core member. The extending portion can increase the rigidity of the armrest core member against the load from the above. Accordingly, it is possible to realize an armrest in which, without increasing the number of parts or assembly process, the shock of the lateral collision of the vehicle is absorbed by the deformation of the armrest core member, and the armrest core member is not easily deformed during normal use.

The rib may be integrally formed with the lower surface of the armrest core member. According to this configuration, the rigidity of the armrest core member against the load from the above can be further increased.

The armrest core member may include a weakened portion. A strength of the weakened portion is lower than the strength of a portion of the armrest core member other than the weakened portion. According to this configuration, since the armrest core member is deformed at the weakened portion, functioning as an origin of fracture at the time of lateral collision of the vehicle, the deformation of the armrest core member can absorb the shock of the lateral collision of the vehicle.

The weakened portion may include a step portion formed in the armrest core member, and the step portion may extend in a longitudinal direction of the vehicle. According to this configuration, since the armrest core member is easily deformed at the step portion extending in the longitudinal direction of the vehicle, functioning as an origin of fracture, the shock of the lateral collision of the vehicle can be more efficiently absorbed.

An end of the extending portion may abut on the step portion. According to this configuration, since the rib can be easily deformed by the load received from the step portion at the time of lateral collision of the vehicle, the shock of the lateral collision of the vehicle can be more efficiently absorbed.

According to the aspect of the present invention, it is possible to provide an armrest for a vehicle in which, without increasing the number of parts or assembly process, the shock of the lateral collision of the vehicle can be absorbed by deformation of the armrest core member, and the armrest core member is not easily deformed during normal use.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
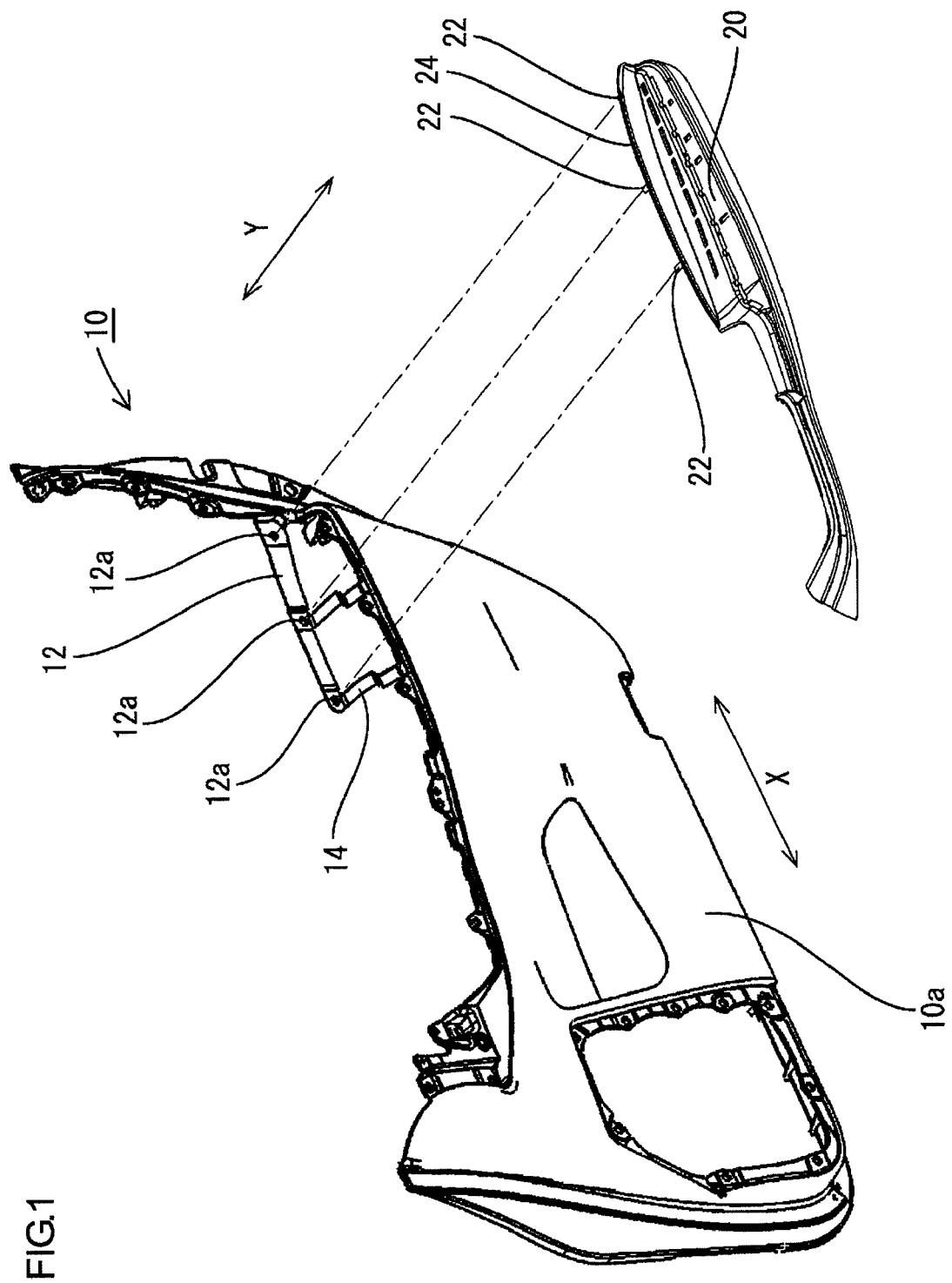
FIG. 1 is a perspective view of a lower board and an armrest core member that form a door trim.

Hereinafter, embodiments of the present invention will be described in detail with reference to the drawings. FIG. 1 is a perspective view showing a lower board 10a and an armrest core member 20 that form a door trim 10 of a vehicle. In the following description, the lower left side of FIG. 1 is the front side of the vehicle, the upper right side of FIG. 1 is the rear side of the vehicle, the upper left side of FIG. 1 is an exterior of the passenger compartment (outboard side), and the lower right side of FIG. 1 is an interior of the passenger compartment (inboard side). Further, the direction of arrow X shown in FIG. 1 indicates a longitudinal direction of the vehicle, and the direction of arrow Y shown in FIG. 1 indicates a lateral direction of the vehicle.

As shown in FIG. 1, the door trim 10 has a plate-like shape made of a synthetic resin material, such as polypropylene, etc., or a material in which a synthetic resin material and a plant fiber are combined. The door trim 10 is a kind of vehicle interior material, and is attached on the inboard side of the door inner panel of a vehicle door (not shown), using clips, etc. The door trim 10 is formed of an upper board (not shown), an ornament material and a lower board 10a. In this embodiment, the lower board 10a to which the armrest core member 20 is attached will be described. A vehicle rear side upper edge portion of the lower board 10a is provided with a bracket 12, which is a portion to which the armrest core member is attached. The bracket 12 and the upper edge portion of the lower board 10a are connected by a connecting portion 14, which has an elongated (long and thin) plate-like member bent to be in a generally Z-shape.

The armrest core member 20 has an elongated plate-like shape extending along the longitudinal direction of the vehicle, and is made of a synthetic resin material, such as polypropylene, etc., or a material in which a synthetic resin material and a plant fiber are combined. Plural bosses 22 (three bosses 22 in this embodiment), which are used to attach the armrest core member 20 to the lower board 10a (door trim 10), are provided to extend from the outboard side surface 24 of the armrest core member 20.

Figure 2:
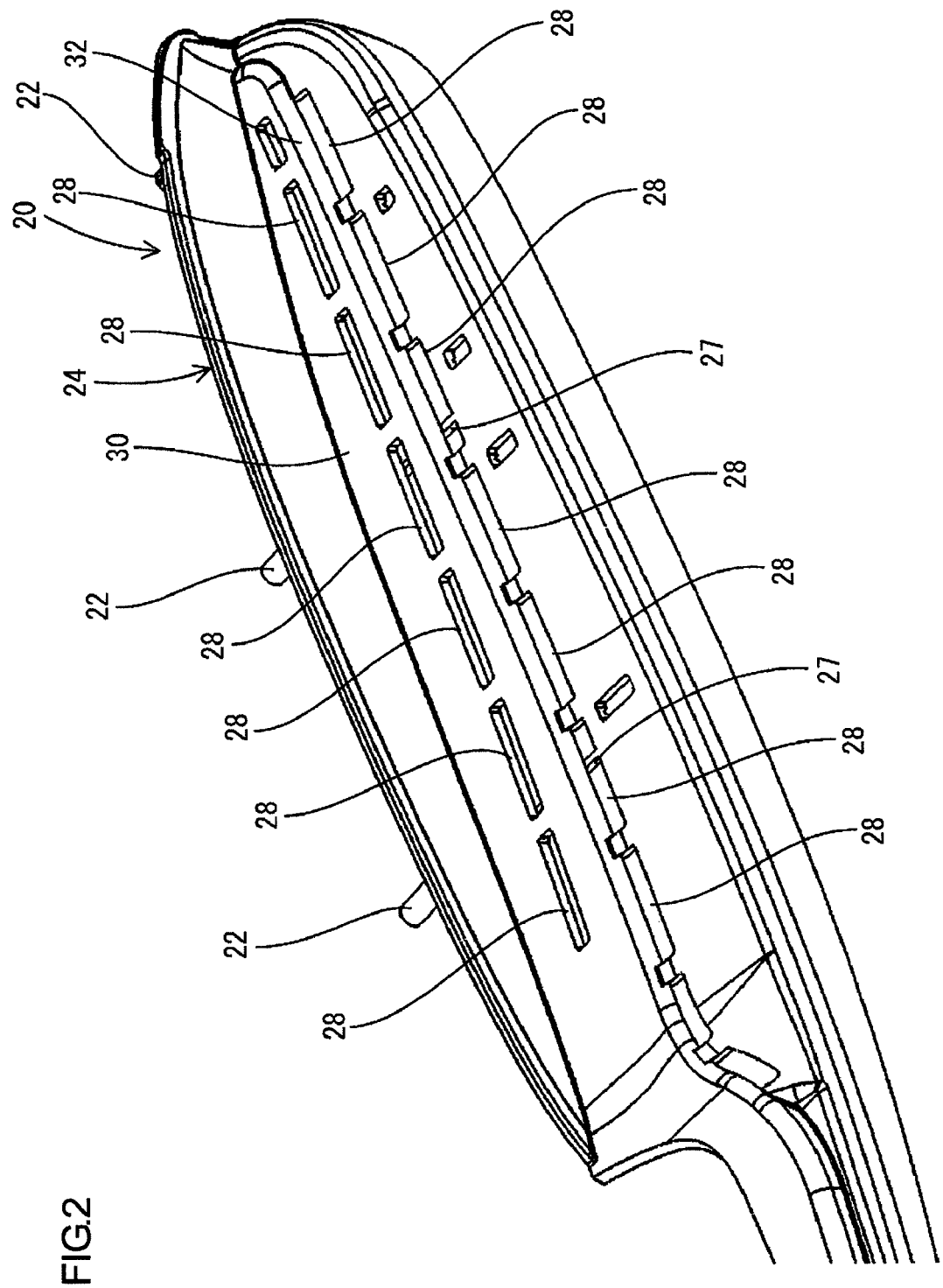
FIG. 2 is a perspective view showing an upper surface side of the armrest core member.
Figure 3:
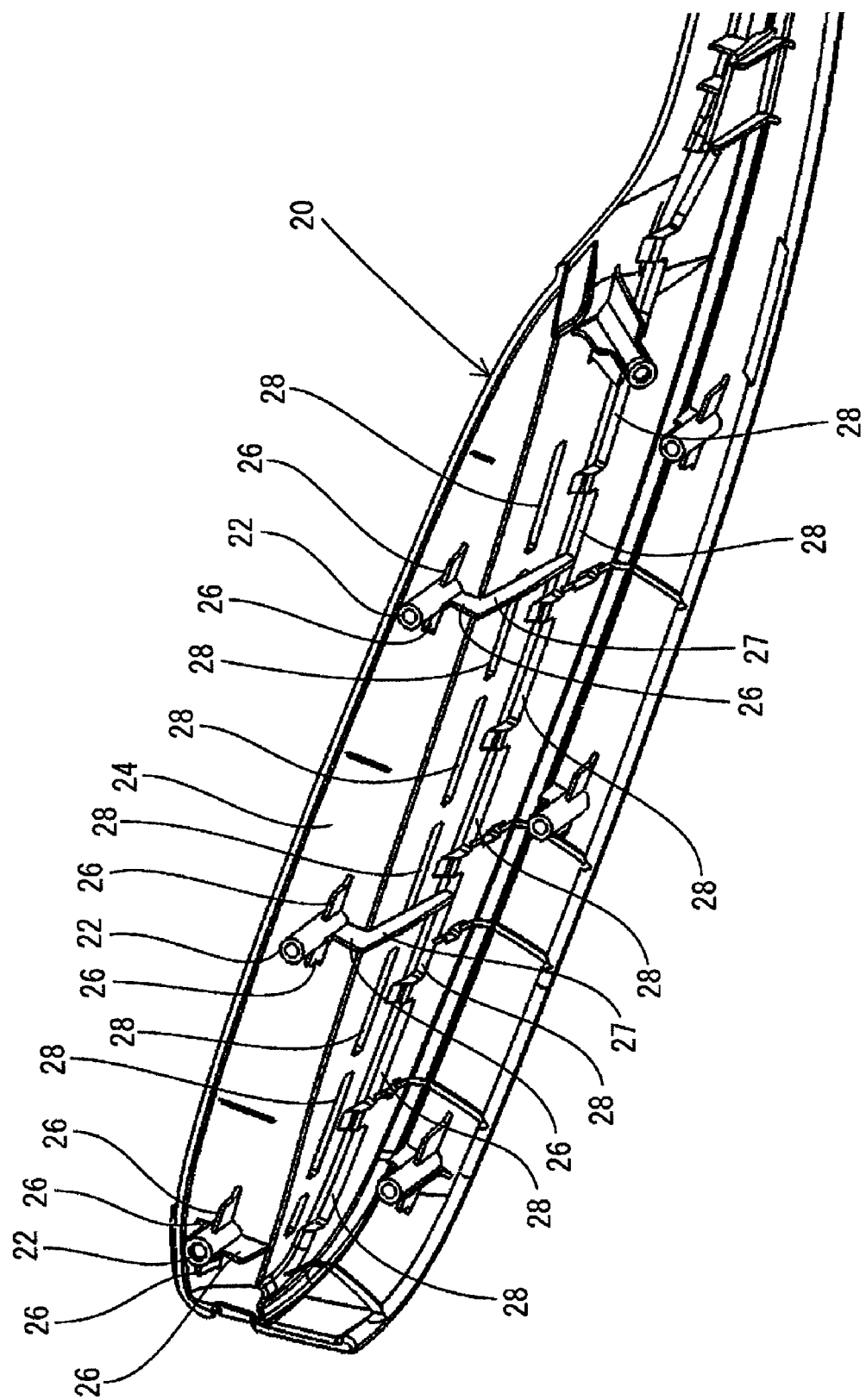
FIG. 3 is a perspective view showing a lower surface side of the armrest core member.
Figure 4:
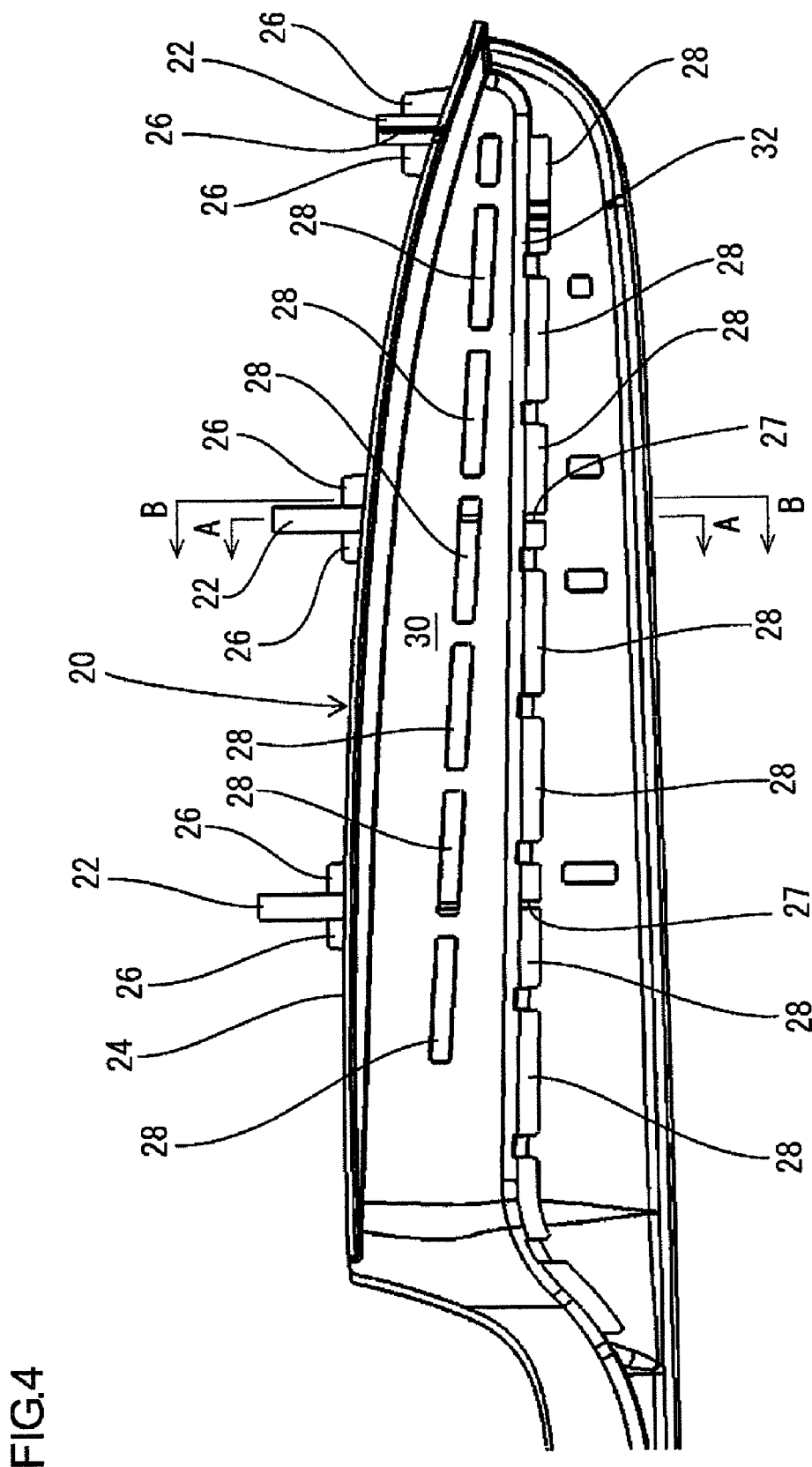
FIG. 4 is a top view of the armrest core member.
Figure 5:
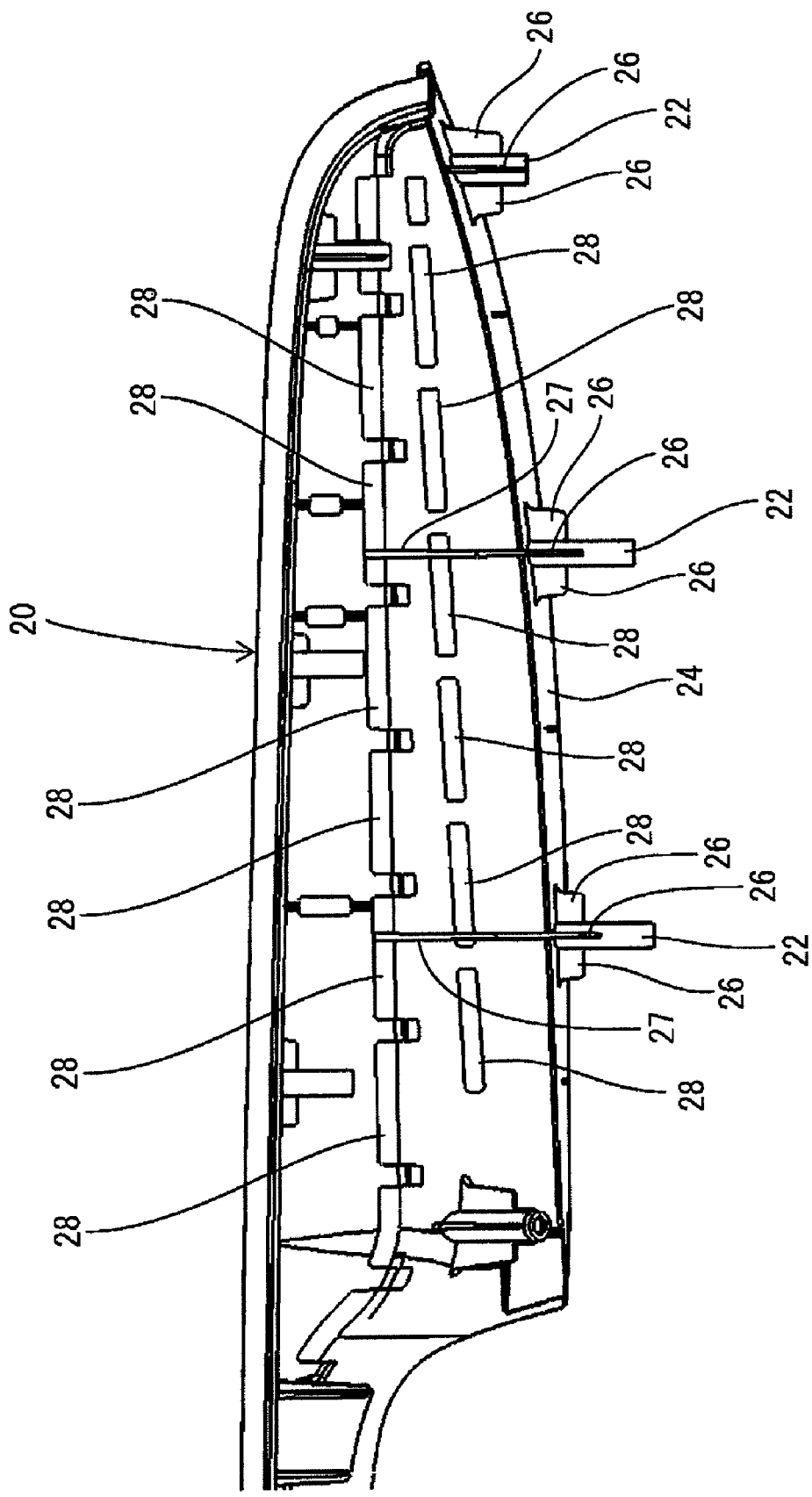
FIG. 5 is a bottom view of the armrest core member.

FIG. 2 is a perspective view showing an upper surface side of the armrest core member 20. FIG. 3 is a perspective view showing a lower surface side of the armrest core member 20. FIG. 4 is a top view of the armrest core member 20. FIG. 5 is a bottom view of the armrest core member 20.

As shown in FIGS. 2-5, three bosses 22 are provided to extend from the outboard side surface 24 of the armrest core member 20. These three bosses 22 extend outwardly. Each of the three bosses 22 has a cylindrical shape. Plural ribs 26 are integrally provided on the circumferential surface of the three bosses 22, to reinforce the bosses 22 to be prevented from falling down. In addition to reinforcing the bosses 22, the ribs 26 function as positioning ribs in the lateral direction of the vehicle when the armrest core member 20 is attached to the door trim 10.

The armrest core member 20 has plural opening portions 28 that penetrate the armrest core member 20 in the vertical direction. Each of the plural opening portions 28 has an elongated (long and thin) shape. The plural opening portions 28 are provided in the upper surface 30 of the armrest core member 20 so as to be aligned along a longitudinal direction of the vehicle and to be arranged in multiple rows (two rows in this embodiment). The strength of the plural opening portions 28 is set lower than that of the other portions of the armrest core member 20. The plural opening portions 28 may be regarded to correspond to the "weakened portion" in the claims of the present invention.

Further, the upper surface 30 of the armrest core member 20 is provided with a step portion 32 extending along the longitudinal direction of the vehicle. The strength of the step portion 32 is set lower than that of the other portions of the armrest core member 20. The step portion 32, as well as the opening portions 28, may be regarded to correspond to the "weakened portion" in the claims of the present invention. Additionally, a part of the opening portions 28 in the plural opening portions 28 described above, is positioned to be adjacent to the step portion 32 and to be aligned along the longitudinal direction of the vehicle.

Figure 6:
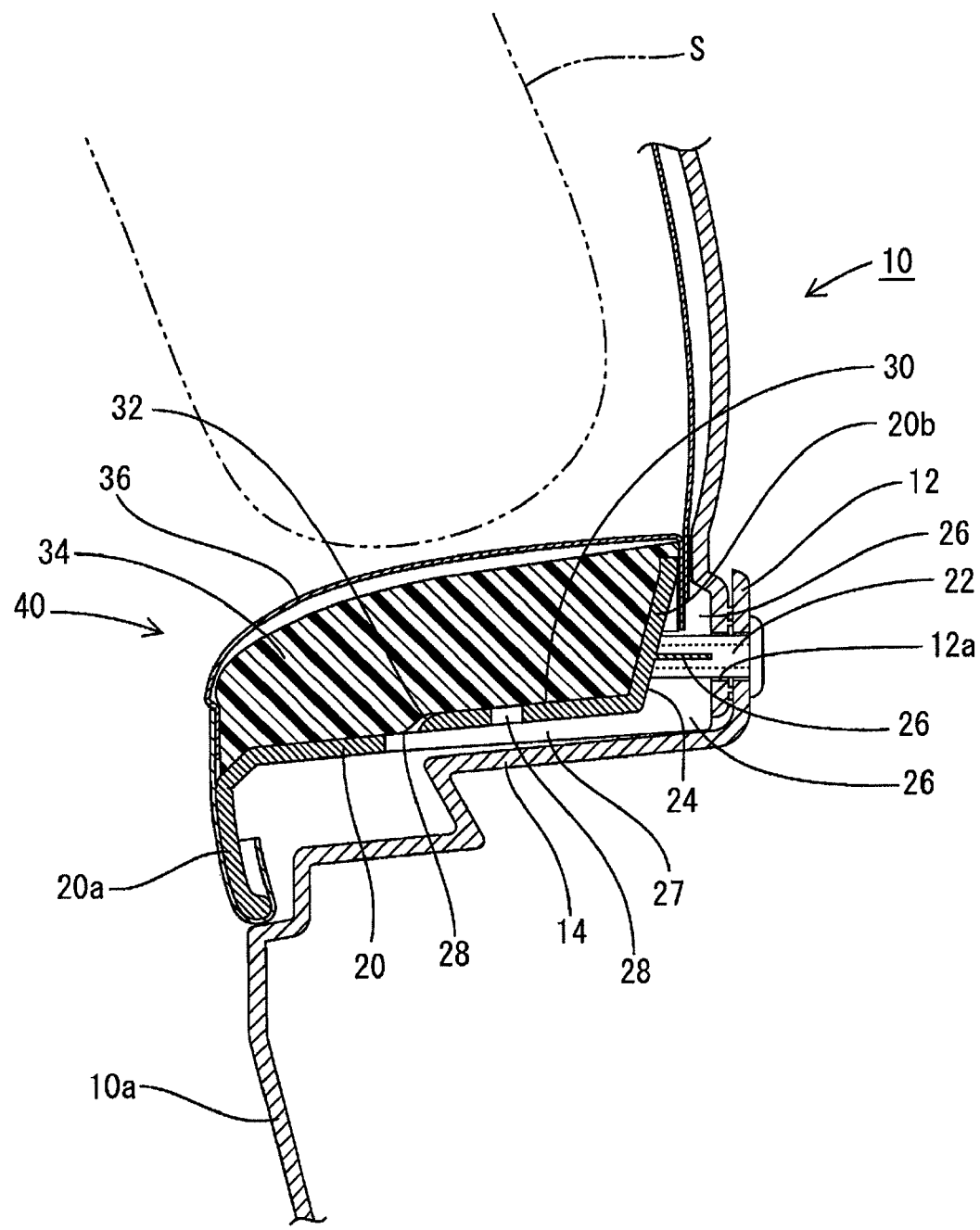
FIG. 6 is a cross-sectional view showing a state of the armrest core member attached to the door trim.

The upper surface 30 of the armrest 20 on the outboard side of the step portion 32, as a boundary, is higher than that on the inboard side thereof by about the board thickness of the armrest core member 20 (see FIG. 6).

The bracket 12 to which the armrest core member 20 is attached is provided with three attachment openings 12a (see, FIG. 1). In order to attach the armrest core member 20 to the bracket 12, the bosses 22 of armrest core member 20 are inserted into the attachment openings 12a from the inboard side, and then an ultrasonic horn, a soldering iron, or the like is pressed to the tip portions of the bosses 22. Accordingly, the bosses 22 are fixed such that the tip portions of the bosses 22, which are melted and deformed, prevent the bosses 22 from coming off from the attachment openings 12a.

FIG. 6 is a cross-sectional view showing a state after the armrest core member 20 is attached to the door trim 10. In FIG. 6, the left side is the interior of the passenger compartment (inboard side), and the right side is the exterior of the passenger compartment (outboard side). As shown in FIG. 6, the inboard side end portion 20a of the armrest core member 20 is bent downward. On the other hand, the outboard side end portion 20b of the armrest core member 20 is bent upward. In other words, the cross section of the armrest core member 20 has a cranked shape. The bosses 22 are integrally provided to extend from the outboard side surface (side surface 24) of the side end portion 20b, which is bent upward.

As shown in FIG. 6, a cushion member 34 is attached to the upper surface 30 of the armrest core member 20. The cushion member 34 is made of a shock-absorbing material, such as rigid urethane, etc. The armrest core member 20 and the cushion member 34 together form the armrest 40 for a vehicle of this embodiment. The upper surface of the cushion member 34 is covered by a cover member 36 to improve the design and the hand feeling of the armrest 40 for the vehicle. The cover member 36 may be made of a synthetic resin sheet, fabric cloth, nonwoven cloth, leather, or the like. A vehicle passenger S can rest his/her elbow on the upper surface of the cushion member 34 of the armrest 40 for the vehicle.

Figure 7:
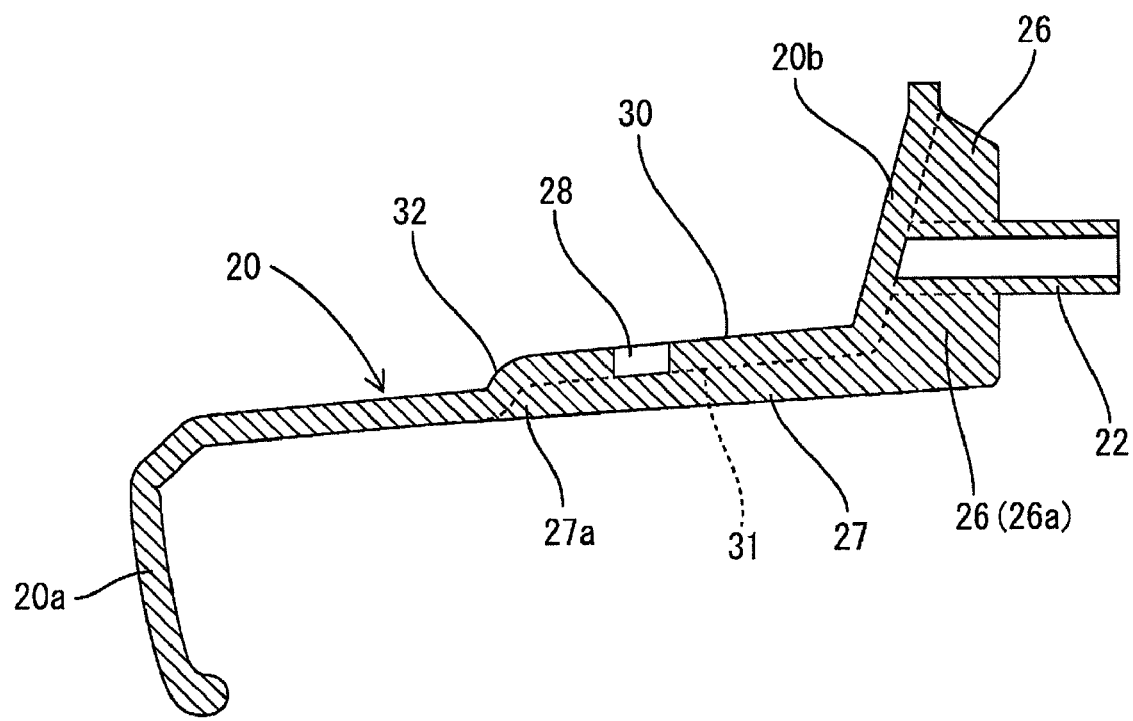
FIG. 7 is a cross-sectional view of the armrest core member taken along the line A-A of FIG. 4.
Figure 8:
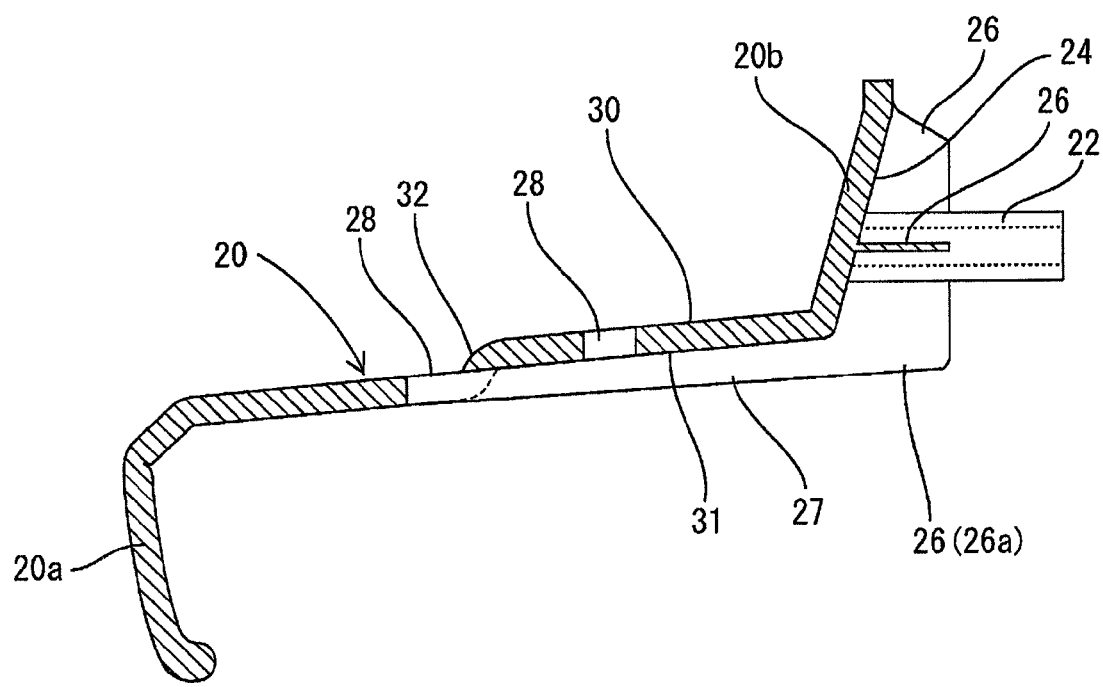
FIG. 8 is a cross-sectional view of the armrest core member taken along the line B-B of FIG. 4.

FIG. 7 is a cross-sectional view of the armrest core member 20 taken along the line A-A of FIG. 4. FIG. 8 is a cross-sectional view of the armrest core member 20 taken along the line B-B of FIG. 4. As shown in FIGS. 7 and 8, plural ribs 26 are integrally formed on the circumferential surface of the cylindrical boss 22. In the plural ribs 26, a rib 26a formed on the lower side of the armrest core member 20 has an extending portion 27 that extends in the lateral direction of the vehicle. More specifically, the rib 26a extends inboard from the proximal end portion of the boss 22, and this extending portion forms the extending portion 27. The extending portion 27 is integrally formed with the lower surface 31 of the armrest core member 20. Further, an end 27a of the extending portion 27 abuts on the step portion 32 formed on the armrest core member 20. Moreover, the extending portion 27 may preferably extend to cross the opening portion 28, to achieve securing the rigidity of the armrest core member 20 against the load from the above, and effectively absorbing the shock of collision, at the same time.

Next, functions of the armrest 40 for the vehicle constructed as described above will be described. According to the armrest 40 for the vehicle of this embodiment, the armrest core member 20 is provided with plural opening portions 28, and the plural opening portions 28 are provided in the upper surface 30 of the armrest core member 20 to be aligned along the longitudinal direction of the vehicle. Accordingly, the armrest core member 20 is easily deformed at the opening portions 28, functioning as an origin of the fracture, at the time of lateral collision, thereby absorbing the shock of the lateral collision by deformation of the armrest core member 20.

The armrest core member 20 is provided with the step portion 32, and the step portion 32 is provided in the upper surface 30 of the armrest core member 20 to extend in the longitudinal direction of the vehicle. Accordingly, the armrest core member 20 is easily deformed at the step portion 32, functioning as an origin of the fracture, at the time of lateral collision, thereby absorbing the shock of the lateral collision by deformation of the armrest core member 20.

The extending portion 27, which is formed by extending the rib 26 formed on the circumferential surface of the boss 22 in the lateral direction of the vehicle, is integrally formed with the lower surface 31 of the armrest core member 20. Accordingly, the rigidity of the armrest core member 20 against the load from the above is increased, thereby preventing the armrest core member 20 from being deformed during normal use.

The end 27a of the extending portion 27 formed by extending the rib 26 abuts on the step portion 32. Accordingly, at the time of lateral collision, the extending portion 27 is easily buckled and deformed by receiving the load from the step portion 32. As a result, the shock of the lateral collision of the vehicle can be more effectively absorbed.

The present invention is not limited to the embodiment described above with reference to the drawings. For example, the following embodiments can be included in the technical scope of the present invention. Further, besides the following examples, various changes may be made without departing from the scope of the present invention.

(1) In the above-described embodiment, the extending portion 27 is integrally formed with the lower surface 31 of the armrest core member 20. However, the extending portion 27 can be integrally formed with the upper surface 30 of the armrest core member 20. In this case as well, the rigidity of the armrest core member 20 against the load from the above can be increased.

Figure 9:
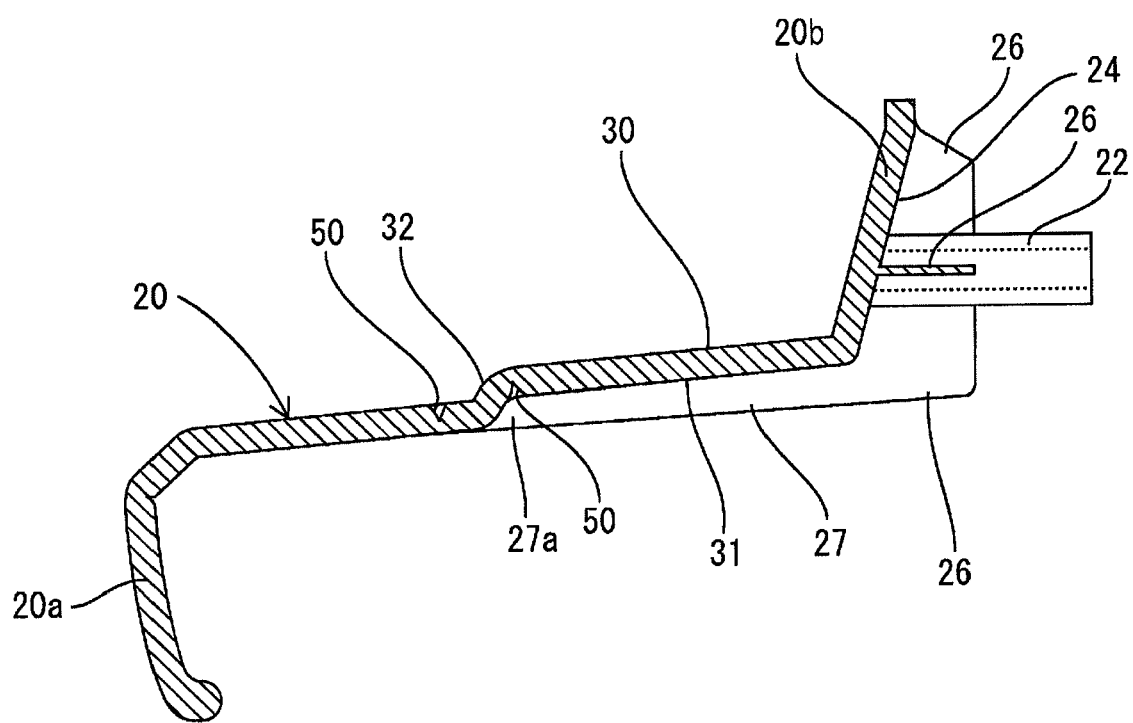
FIG. 9 is a cross-sectional view showing an example of an armrest core member in which grooves having a generally V-shaped cross section are formed.

(2) In the above-described embodiment, as an example of the "weakened portion" to make the armrest core member 20 be easily deformed at the time of lateral collision of the vehicle, the opening portions 28 are provided in the armrest core member 20. However, the present invention is not limited thereto. For example, as shown in FIG. 9, a groove 50 that has a generally V-shaped cross section and extends in the longitudinal direction of the vehicle can be provided in each of the upper surface 30 and the lower surface 31 of the armrest core member 20. In this case as well, the armrest core member 20 can be easily deformed at the time of lateral collision of the vehicle.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An armrest for a vehicle, comprising:
   an armrest core member;
   a cushion member attached on an upper surface of the armrest core member;
   a boss extending from the armrest core member, the armrest core member being attached to a door trim of the vehicle by the boss; and
   a rib provided on an outer circumferential surface of the boss, the rib having an extending portion extending in a lateral direction of the vehicle,
   wherein the extending portion is integrally formed with an upper surface or a lower surface of the armrest core member.

2. The armrest for a vehicle according to claim 1, wherein the extending portion is integrally formed with the lower surface of the armrest core member.

3. The armrest for a vehicle according to claim 1, wherein the armrest core member includes a weakened portion, a strength of the weakened portion being lower than the strength of a portion of the armrest core member other than the weakened portion.

4. The armrest for a vehicle according to claim 3, wherein the weakened portion includes a step portion formed in the armrest core member, and the step portion extends in a longitudinal direction of the vehicle.

5. The armrest for a vehicle according to claim 4, wherein an end of the extending portion abuts on the step portion.

6. The armrest for a vehicle according to claim 3, wherein the weakened portion includes an opening portion provided in the armrest core member, and the extending portion is provided to cross the opening portion.

* * * * *